United States Patent [19]

Vigneau et al.

[11] Patent Number: 4,683,905
[45] Date of Patent: Aug. 4, 1987

[54] FLUID DISTRIBUTION CONNECTOR, IN PARTICULAR FOR HOSPITALS

[75] Inventors: Jean-Louis Vigneau, Varilhes; Pierre Trenque, Ramonville St Agne; Bruno Rivoire, Toulouse, all of France

[73] Assignee: Duffour et Igon S.A. (D.I.), Toulouse, France

[21] Appl. No.: 819,029

[22] Filed: Jan. 15, 1986

[30] Foreign Application Priority Data

Jan. 18, 1985 [FR] France ............................... 85 00681

[51] Int. Cl.⁴ ........................ F16K 15/28; F16L 37/28
[52] U.S. Cl. ................................ 137/329.1; 137/360; 137/614.19; 251/149.6; 251/149.8
[58] Field of Search ................ 137/329.1, 614.19, 360; 251/89.5, 149.6, 149.1, 149.8

[56] References Cited

U.S. PATENT DOCUMENTS

| | | | |
|---|---|---|---|
| 1,679,736 | 8/1928 | Murphy | 251/149.8 |
| 2,322,168 | 6/1943 | Smith | 251/149.6 |
| 2,444,889 | 7/1948 | Braidwood | 251/89.5 |
| 3,563,267 | 2/1971 | Thompson | 137/329.1 |

FOREIGN PATENT DOCUMENTS 389,931 7/1908 France ............................... 251/89.5
598208 12/1975 France .

Primary Examiner—A. Michael Chambers
Attorney, Agent, or Firm—Sixbey, Friedman & Leedom

[57] ABSTRACT

Fluid distribution connector made up of a connector body (1) provided with a fluid intake (4, 33') and means to assure the circulation of the fluid between this intake and a connector tip (13, 39) only when this tip is introduced into the connector body, characterized in that it comprises a jacket (2, 25) whose rear chamber (3, 26) can communicate with fluid intake (3, 34) and in which slides a piston (5, 17) provided with a circulation duct in the form of an axial blind hole (6, 18) open at the front and radial bores (7, 19) at the rear, this piston being kept by the pressure of fluid in the closed position, for which the radial bores are located in the jacket, against a stop (8, 36), while introduction of connector tip (13, 39) shove it in its open position for which radial bores (7, 19) come out in rear chamber (3,26).

3 Claims, 5 Drawing Figures

FLUID DISTRIBUTION CONNECTOR, IN PARTICULAR FOR HOSPITALS

The invention relates to a fluid distribution connector made up of a connector body provided with a fluid intake and means to assure circulation of the fluid between this intake and a connector tip only when this tip is introduced into the connector body.

It has more particularly, although not in a limiting way, the object of making available to hospitals a wall fluid distribution connector according to national and international standards, which are increasingly strict in this matter, able to be easily connected to specific ducts bringing to the use site the various fluids necessary for providing care. As is known, such connectors must be absolutely fluid-tight when the tip is disconnected. They must be designed to receive various locking rings for each specific type of tip of a specific fluid. When a tip is locked on, any accidental ejection and any leak must be avoided.

For this purpose, the invention aims at a fluid distribution connector which comprises a jacket whose rear chamber can communicate with the fluid intake and in which slides a piston provided with a circulation duct in the form of an axial blind hole open at the front and with radial bores at the rear, this piston being kept, by the pressure of the fluid in the closed position for which the radial bores are located in the jacket, against a front stop, while introduction of the connector tip shoves it in the open position for which the radial bores come out in the rear chamber.

It can be seen that, as soon at the connector tip is withdrawn, all circulation of fluid is cut off, since the pressure itself of the fluid moves the piston to bring it in the closed position for which the radial bores are blocked by the jacket. Only introduction of the tip allows circulation of the fluid from the intake and rear chamber to the tip itself by the radial bore and blind hole.

According to a particularly simple and effective embodiment of the invention, the jacket is solid with the connector body.

According to another embodiment of the invention, to which it seems that preference should given, when relatively frequent cleanings of the connector must be envisaged, the jacket in turn slides in a cylindrical lengthening piece of the connector body between a safety position in which it is held by the pressure of the fluid against a safety stop and an open position for which its chamber communicates by radial bores with an intake chamber of the body, an open position in which it is held by a removable pin.

Preferably, the removable pin, through which the connector tip can pass, also constitutes the front stop of the piston.

Thanks to this arrangement, the user has the possibility of removing the removable pin when the connector tip is not in active position in the connector, i.e., when the latter is not used. The jacket then slides in the lengthening piece under the action of pressure of the fluid and comes to rest against the safety stop. In this position, it cuts off the circulation of the fluid, and the user can proceed in total safety to cleaning, on the one hand, rear chamber and the cylindrical part of the jacket and, on the other hand, the parts that he has extracted, i.e., the piston and pin with their possible accessories.

According to an improvement coming within the scope of the invention, seals are provided at the rear of the piston and jacket. It has been found to be more effective to place the seals on the mobile parts of the connector, because in this way their wear is less and monitoring of them is easier, since these mobile parts can often be extracted.

Advantageously, the radial bores come out in a peripheral groove.

These grooves, which can be provided on the piston, jacket or both, facilitate circulation of the fluid and avoid any need of wedging in rotation the mobile parts of the connector.

Further, according to a particularly important improvement coming within the scope of the invention, the jacket comes out in the rear chamber by a bevel with a slight slope, and when the jacket itself in turn slides in a lengthening piece of the body, this lengthening piece in turn comes out in the intake chamber by a second bevel with a slight slope.

These bevels facilitate the movements of the piston in the jacket and of the latter in the lengthening piece but their main effect is greatly to reduce the wear at the radial bores and peripheral grooves and especially practically to eliminate any wear of the seals. The seal of the piston, which goes in and out of the jacket at each use of the connector, will actually never pass through an abrupt zone but, on the contrary, will be guided by the bevel of the jacket. The same advantage is found for the jacket seal each time it has to go in or out of the lengthening piece.

Preferably, a compression spring is inserted between the bottom of the rear chamber and the bottom of a seat of the piston head, and another compression spring is inserted between the bottom of the intake chamber and the bottom of the jacket head when it slides in a lengthening piece of the body.

Thus there is assured, in a sure way, the movement of the two mobile parts even if the pressure of the fluid experiences a transitory or accidental drop and even if, for any reason, this movement is braked or opposed.

Two embodiments of the invention are now described by way of nonlimiting example with reference to the accompanying drawings in which.

FIG. 5 again represents the same connector in safety position, disassembled for maintenance.

Figure 1:
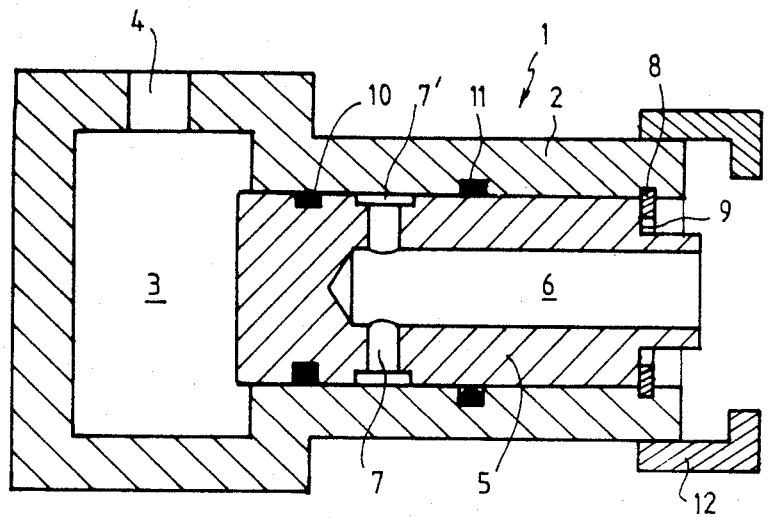
FIG. 1 represents, in longitudinal section, a connector according to the invention in closed position.

The connector shown in FIG. 1 essentially consists of a connector body 1 forming a cylindrical jacket 2 and a rear chamber 3 provided with a fluid intake 4. In jacket 2 is mounted a piston 5 in which have been bored a blind hole 6 coming out at the front of the connector, i.e., on the side opposite the rear chamber and a certain number of radial passages 7 causing communication of blind hole 6 and the outside periphery of piston 5, on which they come out at right angles with a peripheral groove 7. At the front of jacket 2 there is mounted in a suitable groove of this jacket a circlip constituting a front stop 8 which works with a shoulder 9 of the piston. Two seals 10 and 11 are placed respectively in suitable grooves, at the rear of piston 5 and in the central part of jacket 2.

The unit is rounded off by a locking ring 12 mounted at the front of jacket 2 in a known way. It is recalled that such rings are generally cut to be able to work with only a single tip model of the type shown in broken lines as 13 in FIG. 2. Each tip comprises a duct 14 formed here by a blind hole coming after blind hole 6, and a radial bore able to be connected to the duct for routing the fluid to the apparatus being used. Tip 13 also comprises a locking crown 15 working with locking ring 12.

In the position shown in FIG. 1, the pressure of the fluid that goes into rear chamber 3 by intake 4 has shoved piston 5 to the rest position against front stop 8. It is the closed position for which, thanks to the two cooperating cylindrical surfaces of jacket 2 and of piston 5 and thanks to seal 10, the fluid cannot in any way reach peripheral groove 7' and therefore cannot in any way circulate in the duct formed by radial bores 7 and blind hole 6.

Figure 2:
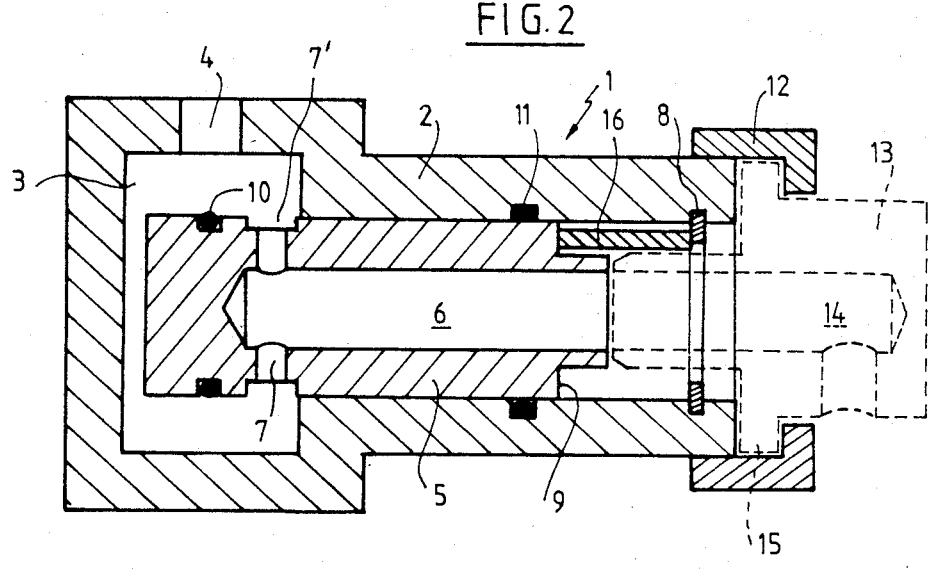
FIG. 2 represents the same connector in open position.

FIG. 2 shows a locking wedge 16 which the user, by shoving piston 5 backward, can place between shoulder 9 of this piston and front stop 8.

This wedge makes it possible to assure circulation of the fluid to run tests or the allow cleaning, since in the position of FIG. 2, which is the open position, the fluid that penetrates into rear chamber 3 can then circulate into the duct formed by radial bores 7 and blind hole 6.

When wedge 16 is not in service, tip 13, shown in broken lines in FIG. 2, can be introduced into the connector so that its crown 15 engages locking ring 12. It then shoves piston 5 into the same position for which it is seen that the fluid circulates from intake 4 by chamber 3, radial bores 7, blind hole 6 and duct 14 to the utilization circuit, the seal assuring fluid-tightness of the connector.

Figure 3:
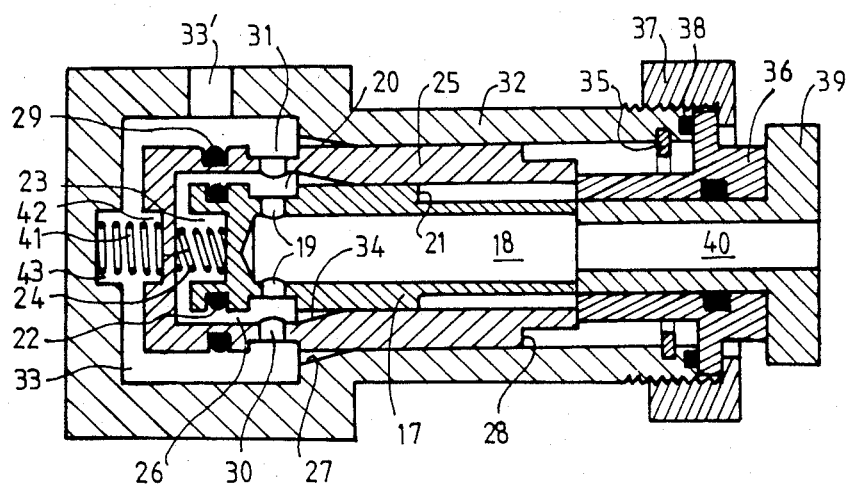
FIG. 3 represents, in longitudinal section, another connector according to the invention in open position.
Figure 4:
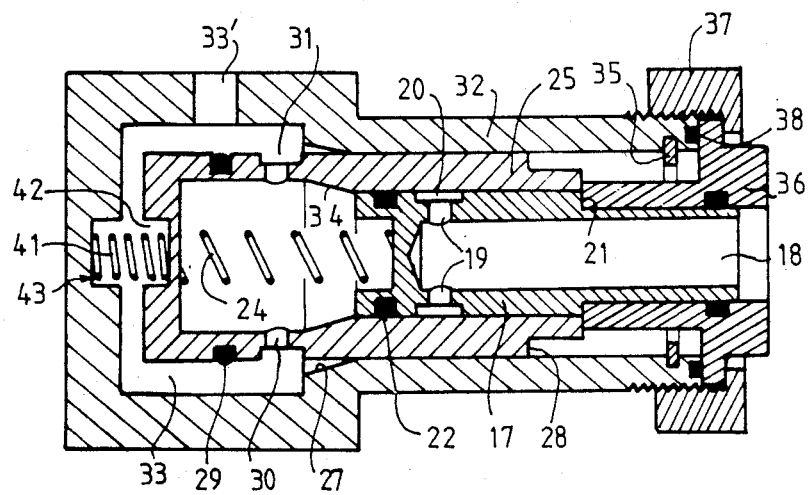
FIG. 4 represents the connector according to FIG. 3 in closed position.
Figure 5:
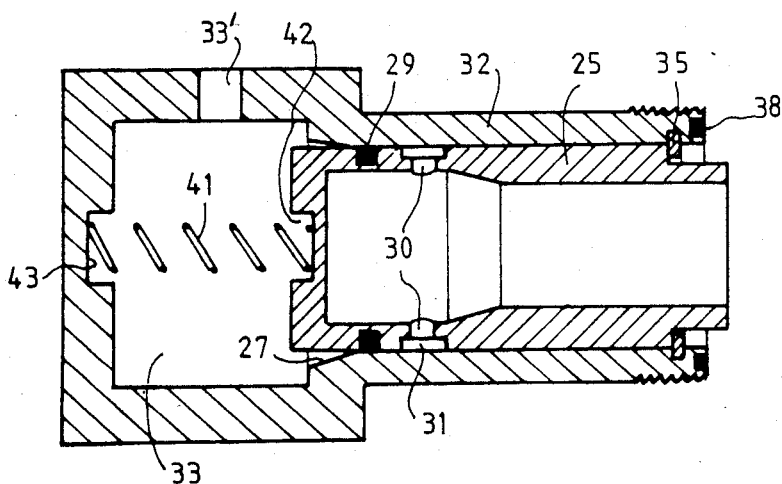

In the embodiment shown in FIGS. 3, 4 and 5, are seen a piston 17 drilled with a blind hole 18 and radial bores 19 which come out in a peripheral groove 20. This piston 17 also comprises a front shoulder 21, a seal 22 placed in a suitable groove at the rear and a seat 23 making it possible to receive a compression spring 24. Piston 17 is mobile inside a jacket 25 provided with a rear chamber 26, the cylindrical part of jacket 25 being connected to the wall of the rear chamber by a bevel with a slight slope 27. Jacket 25 is provided with a front shoulder 28 and, in a suitable groove, a seal 29. It is, of course, equipped with radial bores 30 coming out in a peripheral groove 31.

In turn, jacket 25 is mounted on the inside of a lengthening piece 32 incorporated in connector body and which ends at the back in an intake chamber 33 provided with a fluid intake 33'. The inside periphery of lengthening piece 32 comes out in the intake chamber with a bevel with a slight slope 34 similar to bevel 27. Lengthening piece 32 successively carries at the front a circlip forming stop 35 placed in a suitable groove, then a removable pin 36 whose crown is locked by a nut 37, with insertion of a suitable seal 38. For reasons of clarity, FIGS. 3 to 5 do not show the standard locking ring similar to ring 12 shown in FIGS. 1 and 2 and which makes it possible to introduce and hold a connector tip 39 and one only, this tip comprising here an axial bore 40 which assures the circulation of the fluid to the apparatus to be used.

In the position shown in FIG. 3, removable pin 36, locked by nut 37, has been put in place, which has the effect of shoving backward jacket 25 whose bores 30 are thus in intake chamber 33. Connector tip 39 was then put in place and locked, which has the effect of shoving backward piston 17 whose radial bores 19, in turn, are thus in rear chamber 26 of the jacket. It can be seen that in such a position which is the use position, the fluid circulates from fluid intake 33' successively into intake chamber 33 of connector body, then in the rear chamber of the jacket by radial bores 30, then into blind hole 18 of the piston by radial bores 19, then finally into duct 40 of connector tip 39. If use of the connector is stopped, i.e., if tip 39 is withdrawn, the fluid of the pressure exerted in rear chamber 26 aided by compression spring 24 brings piston 17 into the closed position shown in FIG. 4 for which shoulder 21 of the piston strikes against removable pin 36. It can be seen that in this position, the pressurized fluid is in intake chamber 33 of the body and in rear chamber 26 of the jacket but, thanks to the cooperation of the cylindrical surfaces of jacket 25 and of piston 17 and thanks especially to seal 22, this pressurized fluid cannot reach peripheral groove 20 and therefore cannot circulate in radial bores 19 and in blind hole 18.

It will have been noted that during the movement that bring piston 17 from its open position according to FIG. 3 to its closed position according to FIG. 4, seal 22 has been progressively been caused by bevel 34 to compress without any wear or deterioration being possible. Also, the sections of peripheral groove 20 and the groove that contains seal 22 have progressively come in contact with jacket 25.

The role played by seal 38 when the connector is in any of its positions according to FIGS. 3 and 4 should also be stressed. Play can exist, on the one hand, between lengthening piece 32 and jacket 25 and, on the other hand, between jacket 25 and piston 17. Seal 38 assures fluid-tightness of the connector in regard to the outside despite this play.

Finally, reference is made to FIG. 5 which represents the position occupied by jacket 25 when lock nut 37 and removable pin 36 are removed. Jacket 25, thanks to the pressure of the fluid that is exerted in intake chamber 33, optionally assisted by a compression spring 41 whose ends are received by a seat 42 provided in the wall of rear chamber 26 of jacket 25 and a seat 43 provided in the rear wall of intake chamber 33, has brought jacket 25 to rest by its shoulder 28 on safety stop 35. Closing of the connector is assured since the fluid present in intake chamber 33 is denied access to radial bores 30 thanks to the two cooperating cylindrical of lengthening piece 32 and of jacket 25 and thanks especially to seal 29.

It is possible in this safety position to inspect, maintain and clean, on the one hand, the inside of jacket 25 and, on the other hand, all the parts that have been removed, i.e., removable pin 36, piston 17 and its seal and spring 24.

We claim:

1. A fluid distribution connector formed of a connector body having a fluid intake communicating with an intake chamber and means to assure the circulation of fluid between said intake and a connector tip only when said tip is introduced into the connector body, said connector comprising:

a jacket having a rear chamber adapted for communicating with said fluid intake, a piston slidably positioned within said jacket, said piston including an axial blind hole therein for providing a circulation duct for the fluid, said axial blind hole being open at its front and closed at its rear and including radial bore adjacent said rear, said piston slidable in said jacket between a closed position in which it is urged by the pressure of the fluid against a stop with said radial bores out of fluid communication with said rear chamber and an open position in which introduction of said connector tip forces said piston toward said rear chamber with said radial bores in fluid communication with said rear chamber, said jacket including radial bores therein for fluid communication between said rear chamber and said intake chamber and slidably positioned in a cylindrical lengthening piece of said connector body between a safety position in which said jacket is urged by the pressure of the fluid against a safety stop with said rear chamber out of fluid communication with said intake chamber of said connector body and an open position in which said rear chamber is in fluid communication with said intake chamber of said connector body, and removable pin means for sliding said jacket into and maintaining said jacket in its open position, said pin means comprising said stop for said piston in its closed position.

2. A fluid distribution connector according to claim 1, wherein said radial bores in said piston and said jacket communicate with the peripheral surfaces of said piston and jacket, respectively, via peripheral grooves formed in said surfaces.

3. A fluid distribution connector according to claims 1 or 2, wherein said jacket includes a beveled wall at the inlet to said rear chamber and said lengthening piece includes a beveled wall at the inlet to said intake chamber.

* * * * *